Nov. 5, 1968  J. W. FRAZER  3,408,793
APPARATUS FOR AUTOMATIC PREPARATIVE GAS CHROMATOGRAPHY
Filed Jan. 17, 1967
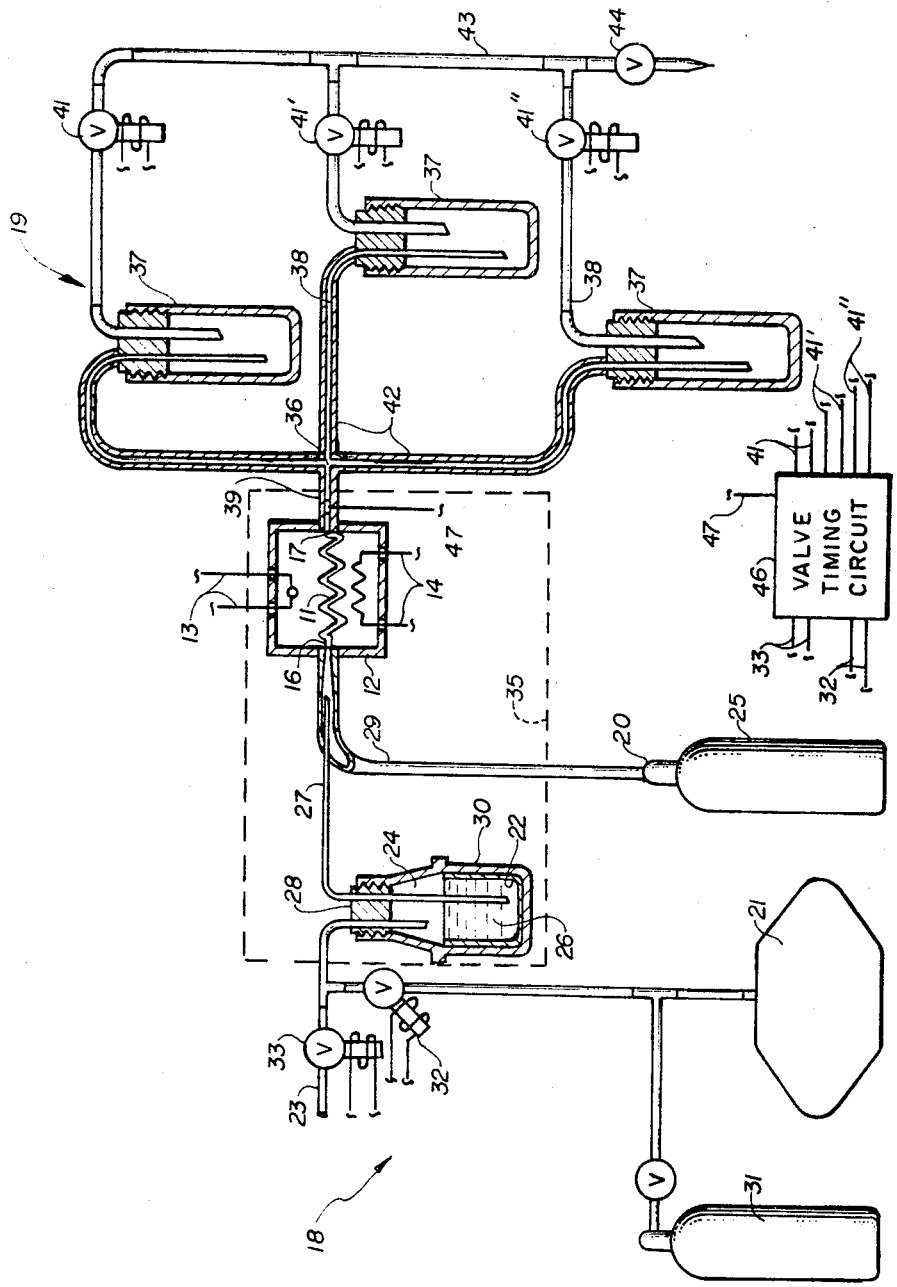
INVENTOR.
JACK W. FRAZER
BY
ATTORNEY United States Patent Office 3,408,793
Patented Nov. 5, 1968

3,408,793
APPARATUS FOR AUTOMATIC PREPARATIVE
GAS CHROMATOGRAPHY
Jack W. Frazer, Pleasanton, Calif., assignor to the United
States of America as represented by the United States
Atomic Energy Commission
Filed Jan. 17, 1967, Ser. No. 610,215
6 Claims. (Cl. 55—197)

ABSTRACT OF THE DISCLOSURE

Preparative gas chromatography apparatus which has no moving parts in those portions of the apparatus which are at elevated temperatures, wherein the samples are injected by an automatic pneumatic injection system, and the resolved products are distributed to a system of traps through diffusion tubing, the flow through which is controlled by valves located in the gas passages beyond the traps.

THE FIELD OF THE INVENTION

The present invention was evolved in the course of, or under Contract W-7405-Eng-48 with the U.S. Atomic Energy Commission.

The present invention generally relates to gas chromatographic apparatus, and appertains especially to preparative gas chromatography apparatus for automatic repetitive batch processing at elevated temperatures, having an integral pneumatic injection system and diffusion-controlled fractionating system, wherein all flow control valves are excluded from the flow path between the sample chamber of the injection system and the collection traps of the extraction system.

BACKGROUND OF THE INVENTION

Preparative chromatography is by its very nature a batch type process, where often very large numbers of relatively small samples must be separated in consecutive identical operations before useful quantities of a desired product can be isolated. Accordingly, for high efficiency, it is imperative that the apparatus be capable of being operated automatically. Moreover, the apparatus should be reliable and in need of but infrequent servicing.

THE PRIOR ART

Conventional chromatography equipment does not fulfill these requirements satisfactorily or expeditiously. A principal source of trouble is the moving components of such apparatus, such as valves, which are especially failure prone due to their constant exposure to the hot gases which are often also corrosive. Thus, valves tend to become leaky and contaminate the products.

Moreover, in conventional injection systems, the samples are introduced either manually, e.g., by means of a syringe, or by bleeding a pressurized sample reservoir onto the column. Such systems present problems from the point of view of automation and introduction of samples of constant size due to the pressure drop in the system.

SUMMARY OF THE INVENTION

I have now developed a gas chromatography apparatus which is ideally suited for automated preparative chromatographic separations, and which is yet rugged and simple. My system comprises a pneumatically operated injection system which is integrally connected to a chromatographic column. Samples of constant and accurately reproducible size are deposited onto the chromatographic column by means of timed applications of gas pressure from a constant pressure source which drives the sample material into the column. The system is entirely valveless in the sense that there are no valves between sample source and column. After each injection, the valveless system is back-flushed by establishing a pressure gradient from the carrier gas back through the injection system, whereby each new sample is injected absolutely in "plug" condition. At the other end, the column is connected to an extraction system which comprises a valveless diffusion junction which branches into tubing sections of predetermined length and diameter, each of which leads directly to a trap and onto a pressure release manifold via a valve gate. By selecting the tubing dimensions in accordance with the diffusion properties of the effluent gases, I have found that the stream can be instantaneously cut at the junction without resort to any moving parts, simply by opening the valve gate which leads from the trap in which the effluent fraction is to be collected. Accordingly, my system is entirely devoid of moving parts in any portion of the apparatus which comes into contact with the samples or the separated products, or with the carrier gas at elevated temperatures. Moreover, the present system allows cutting the effluent fractions without resort to backstreaming carrier gases, whence the fractions reach the traps in undiluted form which facilitates quantitative precipitation.

In summary, then, the principal object of the present invention is to provide a chromatographic apparatus which is rugged and readily automated.

Another important object of the present invention is to provide a chromatographic apparatus from which all moving parts between the sample reservoir and collection traps are eliminated without loss in separating efficiency.

Still another object of the present invention is to provide an injection system capable of introducing absolutely constant and reproducible quantities of starting materials onto the column in "plug" condition.

Yet another object of the invention is to provide a product collection system which has no moving parts or valves in the fractionating portion and which accurately cuts the individual fraction into preselected traps without cross contamination.

These and other objects will become apparent in detail to those skilled in the art upon consideration of the following description of a preferred embodiment, in conjunction with the single figure, which is a schematic diagram of a preferred specific apparatus according to this invention.

DESCRIPTION OF THE PREFERRED
EMBODIMENTS

Referring now to the accompanying schematic diagram, there is shown a chromatographic column 11, which may be individually enclosed in a thermostat 12 for controlling the temperature of the column. The numerals 13 and 14 refer to the electrical leads for the temperature sensor and heating elements included in the heating jacket. The injection and extraction ends 16 and 17 of the column are accessible through the heating jacket for respectively connecting the column to the injection system 18 and product fractionation and collection system 19. The column portion thus far described is entirely conventional and readily available. The specific type of column and column preparation are chosen according to the requirements of the work to be done. The construction and preparation of these columns, as well as the theory of gas chromatography, are discussed in detail in the literature, c.f. V. J. Coates et al., Gas Chromatography, Academic Press, Inc., New York, 1958.

*The injection system.*—The present invention system 18 is a pneumatically operated device which is connected to the inlet 16 of the chromatographic column. The system essentially consists of a pressure reservoir 21, sample storage chamber 22, and a vent line 23. The pressure reservoir 21, sample storage chamber 22 and column 11 are connected in series to allow the direct injection of a sample into the chromatographic column. The pressure reservoir 21 and the vent line 23 are connected in parallel with a suitable valve arrangement for switching the fluid communication with the sample chamber to either of these components. When the vent line 23 connection to the sample chamber is open, the carrier gas pressure established by carrier gas reservoir 25 will tend to drive any starting material in the injection system back into the storage chamber 22. This arrangement thus allows one to dispense with any gating or valve means between the sample storage chamber and the injection column.

More specifically, the sample storage chamber 22 preferably consists of a vertically arranged stainless steel vessel which contains the starting material fluid 26. The storage chamber may be individually heated by a separate thermostatically controlled heater jacket 30, or may be enclosed together with the chromatographic column 11 in a single thermostat 35, as indicated by the broken line. Injection duct 27 extends through the hermetically-sealing chamber cap 28 into the fluid body 26. At the other end, the injection duct penetrates into the carrier gas supply line 29 at the column entrance 16. The diameter of the injection tubing is chosen according to fluid volatility and viscosity, and is generally between about 5–15 mils, smaller diameters being preferred in the case of high volatilities or low viscosity materials, and higher diameters for higher viscosities or low volatilities.

The pressure reservoir 21 should be large compared to the volume of one sample injection, to insure that the pressure drop during injection is negligible. A pressure chamber volume of about one liter has been employed together with injection volumes of 50 microliters or less. The pressure in the reservoir 21 is maintained at a constant level by continuously replenishing the gas from gas storage bottle 31, whereby the gas pressure is maintained at a constant level from injection to injection.

The gas flow path can be determined by any suitable valve combination, for example, by a standard three-way valve located at the junction between the vent line 23, pressure reservoir 21, and sample storage vessel 22. However, for automated operations, it is preferred to employ two standard solenoid valves 32 and 33 in the pressure reservoir line and vent line, respectively. Such valves are described in detail by Sideman et al. in the text, "Gas Chromatography," Academic Press, Inc., New York/London, 1962.

In operation, the sample fluid 26 is placed into storage vessel 22 and the vessel is hermetically closed with respect to the atmosphere by tightly sealing cap 28. The column is then pressurized, normally to about 2–5 atmospheres, by opening the carrier gas supply valve 20. The pressure reservoir is then filled to give an injection pressure of about 50–100 p.s.i. above the pressure of the column entrance. To inject a sample, vent line valve 33 is closed and pressure line valve 32 is opened for a predetermined time interval corresponding to the size of the sample to be injected onto the column 11. The sample is forced into the column by the increased pressure applied to the headspace 24 in the sample storage vessel. After lapse of the predetermined injection time interval, vent line valve 33 is opened and pressure line valve 32 closed, which relieves the driving pressure in the headspace and interrupts the flow of sample fluid into injection duct 27. At the same time, the pressure gradient between the carrier gas supply 25 and the atmosphere drives the sample fluid back into the sample vessel and backflushes the line. It is expedient to backflush the injection duct thoroughly to prevent leakage of sample fluid onto the column between injections.

THE COLLECTION SYSTEM

The collection system 19 is connected to the exit end 17 of the chromatographic column 11 and comprises a plurality of traps 37, the exact number of which is generally determined by the number of individual fractions to be collected. For the sake of convenience only three traps are indicated in the drawing. The traps may be of any type capable of retention of the compound to be collected. Thus, chemical precipitation, electrostatic separation or condensation traps may be employed. As a rule, condensation traps packed in Dry Ice or liquid nitrogen are sufficient to quantitatively collect any effluent products ordinarily encountered in gas chromatography. These cold traps offer the additional advantage of cooling the carrier gas stream, which obviates the use of special cooling components for protecting the valves which are located behind the traps. While the choice of trap type is essentially dictated by the requirements of the specific components in the effluent, it is important that each trap be hermetically sealed with respect to the environment, as will become apparent below.

The critically important feature of the collection system is the diffusion junction 36 and tubing sections 38, which are employed to cut and route the effluent stream into the appropriate traps. When the flow path therethrough is open, the controlling parameter of tubing 38 is its diameter, which controls the nature of the flow of the effluent to the traps. This internal diameter must be between about 10 and 60 mils, up to about 40 mils for effluent gases of low molecular weights and low viscosity, e.g., low molecular weight organic compounds such as common solvents like acetone, and higher diameters for compounds of correspondingly greater molecular weights and viscosities. Below a diameter of 10 mils, the tubing is unduly restrictive to the flow of effluent, i.e., the throughput rates fall below about 30 cc./min. at the usually preferred column input pressure levels of no more than a few atmospheres. At diameters above 60 mils, cross contamination into adjacent traps begins to increase and becomes undesirably troublesome, especially with low viscosity effluents. 40–60 mils is preferred for maximum versatility.

The length of the tubing sections, or the distances between the column exit 17 and the traps, should be maintained at a practical minimum, e.g., less than about 2 feet under ordinary circumstances, such that the pressure drop and volume across the capillary tubing sections 38 between the junction 36 and the traps 37 is small compared to the total pressure drop and volume across the system. Under these circumstances, the flow through the tubing 38 is diffusive in nature and effectively prevents cross contamination of the traps.

The diffusion junction 36 is the point at which all of the tubing sections 38 are brought together and where the effluent is cut. A section of capillary tubing 39 of identical diameter as tubing 38 connects the junction with the end of the chromatographic column.

Each of the tubing sections, as well as the connecting tube 39, is heated, e.g., by means of heater tape 42 which is wrapped around the tubes to prevent any effluent from condensing in the tubes before it reaches the trap.

The flow pattern through the collection system is ultimately determined by solenoid valves 41, one of each of which is serially disposed with each trap 37 on the downstream side thereof. The passages controlled by valves 41 open onto pressure relief manifold 43 which terminates in a needle valve 44. The needle valve 44 is used to adjust the exit pressure at the end of column 11 for improved separation of the samples.

In operation, as the effluent passes from the column exit and arrives at the junction 36, its flow is guided into a preselected first trap 37 by opening the corresponding control valve 41 associated therewith, while keeping all other valves 41 closed.

As the fraction carrying the compound species becomes exhausted, the effluent is switched to the next trap by closing the control valve associated with the first trap and simultaneously opening the valve behind the second trap. The diffusive nature of the effluent flow in the collection system and the essentially insignificant pressure differential between the open and closed traps effectively cuts the effluent quantitatively.

Although the foregoing discussion was rendered without regard to the automated manner of operation of the present device, in actual practice each of the solenoid valves 32 and 33 and the control valves 41 are actuated electronically by means of a valve timing circuit 46. Since the solenoid valves 32 and 33 carry out the entire injection function and control valves 41 the entire fractionation and collection operation, it will be readily apparent that the present apparatus is capable of fully automated function.

For the valve timing circuit, standard arrangements may be employed. Valve timing may be based upon an absolute timing scheme, using a timed reference signal to initiate the valving operations. In this case, the time intervals for injection and arrival times of the separated samples at the junction are determined experimentally in trial runs. Alternatively, the collection system may be adapted to switch traps in response to signals issuing from conductivity gauge 47.

Such systems are described in detail in the following references: Ambrose & Collerson, Nature, 177, 84 (1956) and the above-cited work by Sideman et al.

EXAMPLE

A device was built in accordance with the above specific description and the following constructional parameters:

*Injection system.*—Injection duct 27 internal design: .1 mm., length 30 mm. (stainless steel tubing); pressure reservoir capacity: 1 liter.

*Chromatograph type.*—Wilkins Aerograph, Model A-350-B (10 ft. x ¼ in.).

*Collection system.*—Tubing section 38 internal design: 60 mils, length 18 in. (stainless steel); trap type 37: condensation trap.

The following tests were conducted with the specified apparatus, with the following results:

(1) Separation of cis and trans-decaline:
Column preparation, Apiezon L—15% on 42–60 mesh fire brick.
Column temperature=153° C.
Flow rate—100 cc./min.
Injection pressure above col. back pres.—42 p.s.i.
Injection time=2 sec.
Injection quantity=5 microliters.

The trans-decaline was collected in the first trap and the cis decaline collected in a second trap. The time separation between the two fractions was about 3 minutes, with barely detectable cross contamination.

(2) Separation of normal and iso-amyl alcohol:
Column preparation, 20M Carbowax, 15% on 60–80 mesh fire brick.
Column temperature—110° C.
Flow rate—100 cc./min.
Injection pressure—68 p.s.i.
Injection time—4 sec.

The amyl and iso alcohol were collected in two different traps, with no detectable quantities of normal amyl alcohol in the iso alcohol collection trap, and a barely detectable quantity of iso-amyl alcohol in the normal amyl alcohol trap.

(3) Separation of carbon tetrachloride and chloroform:
Column preparation—same as #2.
Column temperature—73° C.
Flow rate—100 cc./min.
Effective injection pressure—35 p.s.i.
Injection time—2 sec.

The carbon tetrachloride and chloroform were collected in two different traps, with no detectable cross contamination.

The foregoing description was given with respect to but one specific embodiment. However, it will be apparent to those skilled in the art that numerous modifications may be made in the invention without departing from the spirit and scope thereof. Accordingly, it is not intended to limit the invention except as defined in the following claims.

I claim:
1. Gas chromatography apparatus, comprising:
 (a) a chromatographic column having a first and second end;
 (b) a carrier gas supply source connected to said first end of said column;
 (c) a sample injection system communicatively connected to said first end of said column, said injection system being comprised of a pressure reservoir having a volume which is large compared to the volume of a sample to be injected into said column, and a sample reservoir connected serially to said first end of said column, a vent means connected to said sample reservoir in parallel with said pressure reservoir, and valve means for selectively opening one of the gas passages between said sample reservoir and said vent means and between said sample reservoir and said pressure reservoir;
 (d) a sample fractionating system comprising a plurality of hermetically closed fraction collection traps having inlets and outlets, diffusion flow tubing connecting said inlets of said traps to a mutual diffusion junction, said junction being in gas flow communication with the second end of said column, and valve-gated conduits hermetically connected to said outlets of said traps, said conduits being adapted to selectively open a passage between said column and the atmosphere through a predetermined trap; and
 (e) means for heating said diffusion flow tubing.

2. The gas chromatography apparatus of claim 1, further defined in that said diffusion flow tubing has an internal diameter between about 40 and 60 mils.

3. The gas chromatography apparatus of claim 1, further defined in that the pressure drop across said sample fractionating system is small compared to the pressure drop across the entire chromatography column.

4. The gas chromatograph of claim 1, further defined in that the injection system includes a pressure gas supply source which is connected to said pressure reservoir.

5. The gas chromatography apparatus of claim 1, further defined in that said valve gated conduits and said valve means are comprised of electrically actuated valves.

6. The gas chromatography apparatus of claim 1, further defined in that said sample reservoir, said chromatographic column and said diffusion flow tubing are enclosed in a singular thermostat.

References Cited
UNITED STATES PATENTS

| | | | |
|---|---|---|---|
| 3,185,211 | 5/1965 | Crawford et al. | 55—386 X |
| 3,245,269 | 4/1966 | Ivie | 73—23.1 X |
| 3,307,333 | 3/1967 | Norem et al. | 55—197 |

REUBEN FRIEDMAN, *Primary Examiner.*

J. L. DE CESARE, *Assistant Examiner.*